United States Patent [19]

Colpaert

[11] 4,102,442
[45] Jul. 25, 1978

[54] DRUM BRAKE

[75] Inventor: James J. Colpaert, Granger, Ind.

[73] Assignee: The Bendix Corporation, Southfield, Mich.

[21] Appl. No.: 793,581

[22] Filed: May 4, 1977

[51] Int. Cl.² ............................................. F16D 65/02
[52] U.S. Cl. ................................ 188/206 A; 188/341
[58] Field of Search ............ 188/78, 335, 341, 206 A, 188/206 R

[56] References Cited

U.S. PATENT DOCUMENTS

| 3,351,159 | 11/1967 | Burnett | 188/206 A |
| 3,576,237 | 4/1971 | Dubuc | 188/206 A |
| 4,061,429 | 12/1977 | Mathues | 188/206 A |

Primary Examiner—Duane A. Reger
Attorney, Agent, or Firm—Paul David Schoenle; Ken C. Decker

[57] ABSTRACT

A drum brake for a motor vehicle includes a backing plate secured to a nonrotatable portion of the motor vehicle. The backing plate mounts a hydraulic actuator which, in turn, carries a pair of brake shoes. The backing plate includes a first portion that attaches to the nonrotatable portion of the motor vehicle and a second portion that extends radially from the first portion. The second portion includes an opening and the hydraulic actuator extends into the opening for mounting the same on the second portion. The pair of brake shoes define a space therebetween and the backing plate is radially disposed substantially within the space. A shield engages the backing plate and extends radially past the pair of brake shoes to engage the pair of brake shoes in order to guide the radial expansion of the latter during braking.

2 Claims, 3 Drawing Figures

DRUM BRAKE

BACKGROUND OF THE INVENTION

Drum brakes generally provide a backing plate and anchor pin for mounting a pair of brake shoes. Such backing plates extend radially from an axle housing to the pair of brake shoes. As the backing plate and anchor pin adds unnecessary weight to the drum brake assembly, it is desirable to provide a drum brake assembly wherein the weight and size of the backing plates are reduced and the anchor pin is removed.

Moreover, a hydraulic actuator between the pair of brake shoes is operable to expand the pair of brake shoes into engagement with a rotatable member to effecutate braking. Generally, this hydraulic actuator is carried by the backing plate and is engaged with the pair of brake shoes.

It is an important object of the present invention to provide a simple lightweight drum brake assembly of rigid construction.

SUMMARY OF THE INVENTION

The drum brake assembly of the present invention provides a backing plate having a first portion thereof engaging a nonrotatable portion of a wheel assembly and a second portion thereof extending radially outwardly from the first portion. An opening in the second portion receives a hydraulic actuator and the hydraulic actuator carries a pair of brake shoes which are radially expandible upon operation of the hydraulic actuator to effectuate braking. An outlet on the hydraulic actuator communicates with a fluid pressure source by means of an outlet passage extending through the second portion opening.

The pair of brake shoes cooperate with each other to define a central space within which the first and second portions of the backing plate are radially disposed.

A shield engages the backing plate and extends radially at least to said pair of brake shoes in order to prevent dust from contacting the drum brake assembly. The shield supports hold down springs which engage the pair of brake shoes in order to direct the radial expansion of the latter.

The hydraulic actuator comprises a housing having a cylindrical bore therethrough and a pair of pistons are slidably disposed within the bore. Slots on both pistons receive respective brake shoes and the slots are curved to receive matching arcuate webs on the brake shoes such that braking torque is transmitted through one of the pistons, depending on the direction of rotation of the drum.

DETAILED DESCRIPTION

Figure 1:
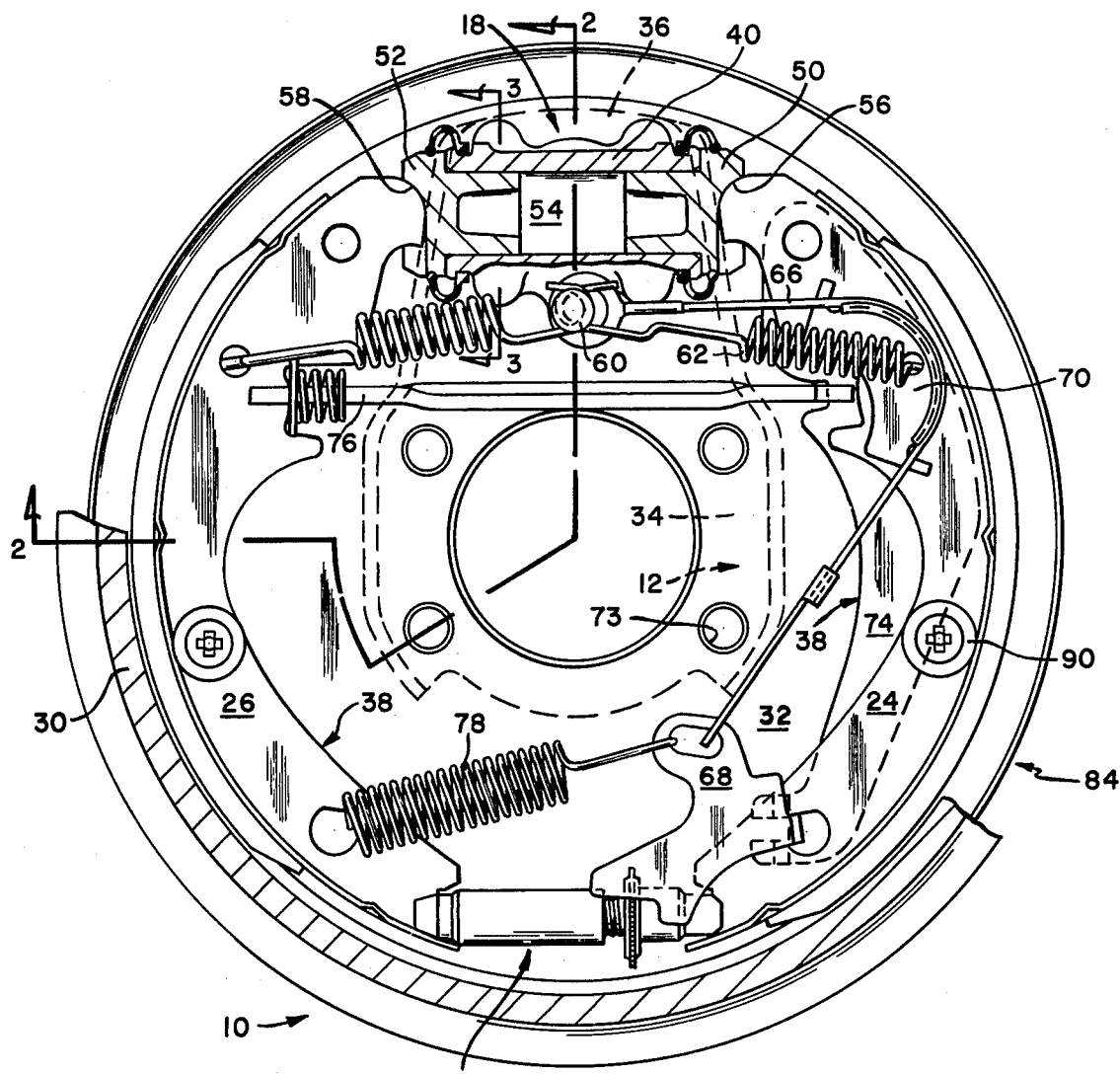
FIG. 1 is a front view of a drum brake made according to the present invention.
Figure 2:
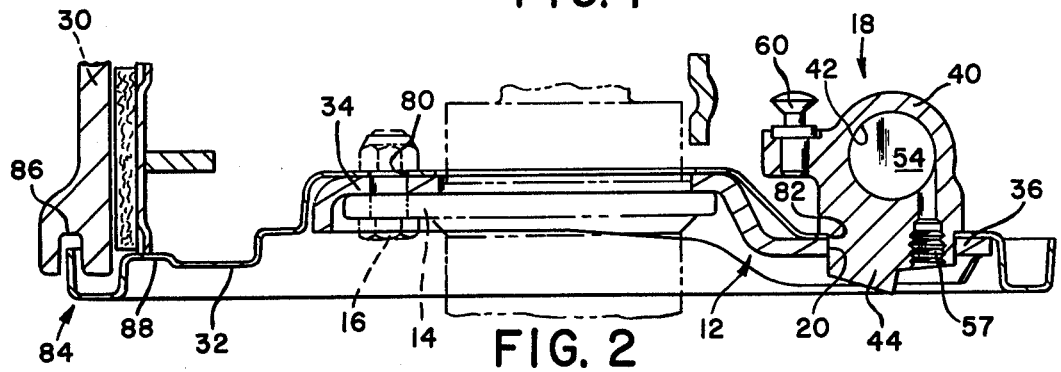
FIG. 2 is a cross-sectional view taken along line 2—2 in FIG. 1.

The drum brake illustrated in FIG. 1 is generally referred to as numeral 10. The brake includes a backing plate 12 made in accordance with the present invention and secured to a nonrotatable portion 14 of an axle or wheel assembly by means of bolts 16. A hydraulic actuator 18 is received within a backing plate opening 20 and a plurality of bolts 46 retain the hydraulic actuator 18 within the opening 20. The hydraulic actuator also carries a pair of brake shoes 24 and 26, respectively, which are movable radially upon operation of actuator 18 to engage a rotatable member 30 such as a wheel drum to effectuate braking. A dust shield 32 is provided to enclose the back of the drum brake assembly and is disposed between the hydraulic actuator 18 and the backing plate 12.

In accordance with the invention the backing plate 12 comprises a first portion 34 which attaches to the nonrotatable portion 14 and a second portion 36 extending radially outwardly from the first portion. As illustrated in FIG. 1, the pair of brake shoes define a central space 38 formed substantially by the inner periphery of the brake shoes and the first portion 34 and the second portion 36 are radially disposed within the central space 38.

Figure 3:
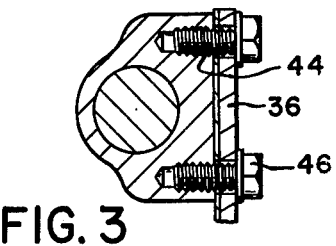
FIG. 3 is a cross-sectional view taken along line 3—3 in FIG. 1.

The second portion 36 includes the backing plate opening 20 within which is mounted the hydraulic actuator 18. The hydraulic actuator 18 comprises a cylindrical housing 40 with a longitudinal bore 42 therethrough and the housing includes an axially extending portion 44 inserted within the opening 20. Viewing FIG. 3, it is seen that a plurality of bolts 46 are threadably received within threaded bores 44 for maintaining the axially extending portion 44 within the opening 20.

The longitudinal bore 42 slidably receives a pair of pistons 50 and 52 which cooperate with the bore 42 to define a pressure chamber 54 between the pistons. The pressure chamber 54 communicates with a pressure source, such as a master brake cylinder, via an outlet passage 57 within the axially extending portion 44. Each piston is provided with a slot 56 and 58 for receiving respective brake shoes 24 and 26. The slots are curved at their bottom walls to mate with the arcuate ends of the brake shoes.

In order to mount the brake shoes on the drum brake assembly, the hydraulic actuator 18 is provided with a post 60 for anchoring a pair of springs 62 and 64 which engage respective brake shoes 24 and 26. The springs urge the pair of brake shoes into engagement with the pistons so that movement of the pair of brake shoes away from the hydraulic actuator 18 is opposed by the springs 62 and 64.

The post 60 also anchors a cable 66 which extends to a pawl 68 via a guide plate 70. The pawl cooperates with an extendible member 72, a lever 74, a cross bar 76, and a spring 78, in a well-known manner to adjust the clearance between the brake shoes and the rotatable member.

The dust shield 32 extends from the first portion 34, where apertures 80 on the shield receive the bolts 16, to the pair of brake shoes 24 and 26. An opening 82 on the shield 32 aligns with opening 20 on the backing plate 12 so that the hydraulic actuator 18 is received within the openings 82 and 20. The outer periphery of the shield 32 is C-shaped at 84 to receive a portion of the rotatable member 30 and to fit into a recess 86 on the rotatable member 30 so that dust is prevented from contacting the hydraulic actuator 18 and brake shoes 24 and 26.

In addition, the dust shield 32 includes a flat surface at 88, adjoining the C-shaped periphery, which slidably engages the brake shoes 24 and 26 in order to guide the radial expansion of the brakes when the hydraulic actuator is operated or pressurized. Hold down spring at 90 maintains the brake shoes in engagement with the flat surface 88.

In conclusion, it is apparent from the foregoing description that the present invention provides a drum brake of lightweight construction wherein the backing plate is radially confined substantially to the central space 38. Moreover, the pair of brake shoes are carried by the hydraulic actuator 18 which is mounted via axial extension 44 to the backing plate second portion 36.

Although the present invention is described with reference to the drum brake illustrated in the drawings, it is intended that all alterations, modifications and additions that are contemplated by one of ordinary skill in the art, are embraced within the scope of the appended claims.

I claim:

1. In a drum brake having a backing plate which supports a hydraulic actuator and a pair of brake shoes movable by the hydraulic actuator into a braking position, the pair of brake shoes having an inner periphery which defines a central space, the improvement wherein said pair of brake shoes terminate in one pair of ends which engage said hydraulic actuator, said backing plate including a first portion which attaches to an axle assembly and is disposed radially within the central space, and a second portion extending radially therefrom, said second portion supporting the hydraulic actuator in order to position said one pair of ends substantially outside said second portion of said backing plate, said hydraulic actuator carrying at least one resilient member engaging said pair of brake shoes to bias said one pair of ends into engagement with said hydraulic actuator, said hydraulic actuator supporting said pair of brake shoes, and a shield is secured between said hydraulic actuator and said second portion of said backing plate.

2. The drum brake of claim 1 in which said first portion of said backing plate engages means for attaching said first portion to the axle assembly and said means also engages said shield to secure said shield to said first portion opposite the axle assembly.

* * * * *